US011884517B2

(12) United States Patent
A B et al.

(10) Patent No.: US 11,884,517 B2
(45) Date of Patent: Jan. 30, 2024

(54) LIFTING LUG FOR HVAC UNIT

(71) Applicant: Johnson Controls Technology Company, Auburn Hills, MI (US)

(72) Inventors: Suriya Prakash A B, Pune (IN); Parag Jivanrao Bhongade, Pune (IN); Nivedita Nath, Pune (IN); Ganesh Shankarrao Devkhile, Pune (IN); Kishor Shinde, Pune (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 539 days.

(21) Appl. No.: 17/081,787

(22) Filed: Oct. 27, 2020

(65) Prior Publication Data

US 2022/0127115 A1 Apr. 28, 2022

(51) Int. Cl.
*B66C 1/66* (2006.01)
*B66C 1/22* (2006.01)
*F24F 13/20* (2006.01)

(52) U.S. Cl.
CPC .................. *B66C 1/66* (2013.01); *B66C 1/22* (2013.01); *F24F 13/20* (2013.01)

(58) Field of Classification Search
CPC ............... B66C 1/66; B66C 1/22; F24F 13/20
USPC ....................................... 294/215, 81.3, 81.5
See application file for complete search history.

(56) References Cited

U.S. PATENT DOCUMENTS 1,462,435 A * 7/1923 West ....................... B66C 1/666 294/215
1,727,685 A * 9/1929 Willoughby ........... B65D 88/12 294/68.1
2,905,501 A * 9/1959 Jakubowski .............. B66C 1/10 294/81.5
3,371,951 A * 3/1968 Bryant ....................... B66C 1/66 411/378
3,482,817 A * 12/1969 Ross ....................... B66C 1/107 254/133 R
3,751,097 A * 8/1973 Jones ......................... B66C 1/10 294/67.5
3,995,903 A * 12/1976 Ernst ..................... F02F 7/0046 294/81.5
4,458,872 A * 7/1984 Couch .................... A47G 1/162 248/222.13
4,733,896 A * 3/1988 Klein ...................... E04G 1/362 294/67.4
5,887,922 A * 3/1999 Hendrix .................... B66C 1/62 294/67.5
6,267,422 B1 * 7/2001 Alba .......................... B66C 1/66 294/215
7,086,815 B2 * 8/2006 Bruns .................... B64D 9/003 410/107

(Continued)

*Primary Examiner* — Paul T Chin
(74) *Attorney, Agent, or Firm* — Fletcher Yoder, P.C.

(57) ABSTRACT

A lifting lug for a heating, ventilation, and/or air conditioning (HVAC) unit includes a first flange configured to be secured against a surface of the HVAC unit, a second flange configured to be secured against the surface of the HVAC unit, and an intermediate portion extending between the first flange and the second flange. The intermediate portion is offset from the first flange and the second flange to form a space between the intermediate portion and the surface of the HVAC unit in an installed configuration of the lifting lug, and the intermediate portion includes an edge and a notch formed in the edge and through a thickness of the intermediate portion.

20 Claims, 8 Drawing Sheets

(56) References Cited

U.S. PATENT DOCUMENTS

| | | | | |
|---|---|---|---|---|
| D814,384 | S * | 4/2018 | Richter | D8/349 |
| 2005/0034390 | A1* | 2/2005 | Dubensky | F24F 3/0442<br>52/302.1 |
| 2009/0065677 | A1* | 3/2009 | Hoff | B28B 7/245<br>249/13 |
| 2022/0243953 | A1* | 8/2022 | Griesinger | F24F 13/32 |

* cited by examiner

LIFTING LUG FOR HVAC UNIT

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. An HVAC system or a portion of the HVAC system may be lifted, such as via a crane, in order to move the HVAC system to a desirable position, such as during installation of the HVAC system. Therefore, there is a need to facilitate lifting operations of HVAC systems.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a lifting lug for a heating, ventilation, and/or air conditioning (HVAC) unit includes a first flange configured to be secured against a surface of the HVAC unit, a second flange configured to be secured against the surface of the HVAC unit, and an intermediate portion extending between the first flange and the second flange. The intermediate portion is offset from the first flange and the second flange to form a space between the intermediate portion and the surface of the HVAC unit in an installed configuration of the lifting lug, and the intermediate portion includes an edge and a notch formed in the edge and through a thickness of the intermediate portion.

In another embodiment, a heating, ventilation, and/or air conditioning (HVAC) unit includes an exterior surface and a lifting lug coupled to the exterior surface. The lifting lug includes a lifting portion, a first flange extending from a first side of the lifting portion, and a second flange extending from a second side the lifting portion. The first flange and the second flange are secured against the exterior surface, the lifting portion is offset from the exterior surface, and the lifting portion includes an edge and a notch formed in the edge.

In a further embodiment, a lifting lug for a heating, ventilation, and/or air conditioning (HVAC) unit includes a first surface configured to be secured against a second surface of the HVAC unit in an installed configuration of the lifting lug and a lifting portion offset from the first surface and configured to be offset from the second surface of the HVAC unit in the installed configuration to form a space between the lifting portion and the second surface of the HVAC unit. The lifting portion includes an edge and a notch formed in the edge.

DRAWINGS

Various aspects of this disclosure may be better understood upon reading the following detailed description and upon reference to the drawings in which.

DETAILED DESCRIPTION

Figure 1:
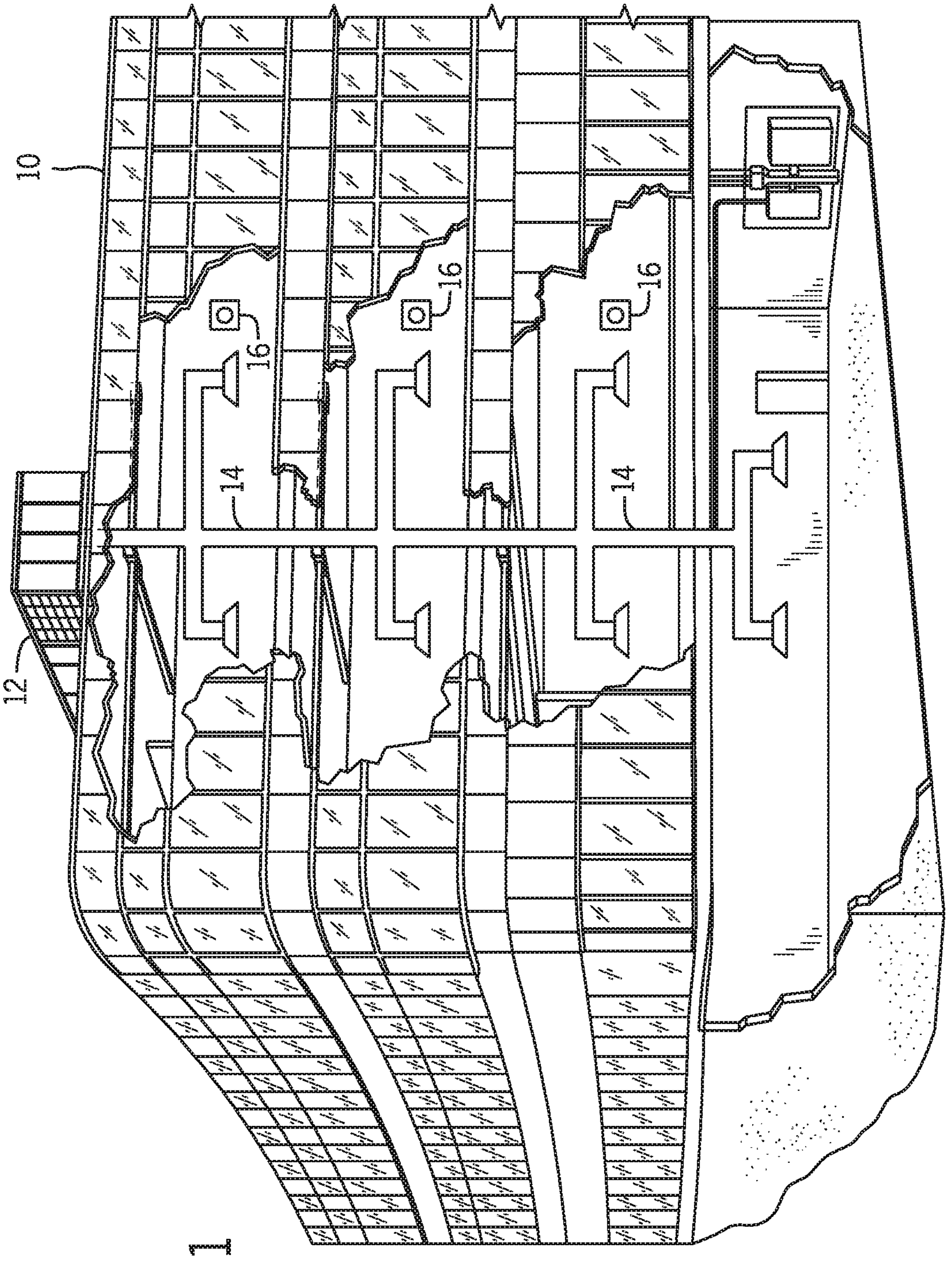
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a lifting system for a heating, ventilation, and/or air conditioning (HVAC) unit. The HVAC unit may condition an air flow and supply the air flow to a space in order to desirably or comfortably condition the space. In some circumstances, the HVAC unit or a portion of the HVAC unit may be lifted and moved to a desirable position or location. For example, the HVAC unit may be lifted during transportation, installation, modification, and so forth, of the HVAC unit.

It may be desirable to lift the HVAC unit by imparting a force onto particular locations of the HVAC unit. Embodiments of the present disclosure are directed to a lifting lug that may be used to facilitate lifting the HVAC unit. For example, the lifting lug may be configured to couple to a support structure, such as an enclosure or frame, of the HVAC unit, and a system (e.g., a crane) may attach to the lifting lug in order to lift the HVAC unit. In some embodiments, the lifting lug may include flanges that couple to a surface of the support structure in an installed configuration and further include an intermediate portion or segment connected to the flanges. The intermediate portion may be offset from the flanges such that the intermediate portion is offset from the surface in the installed configuration, thereby forming a space between the support structure and the intermediate portion of the lifting lug.

The system used for lifting the HVAC system may further include a shackle configured to couple to the lifting lug via the space. For example, the shackle may include a segment having a first end and a second end that collectively define a portion of a channel of the shackle. The second end of the segment of the shackle may extend into the space such that the intermediate portion of the lifting lug is positioned within the channel to couple the shackle to the lifting lug. The shackle may also include a pin that may transition between a closed or secured position and an open or released position. In the open position, the pin may be retracted away from the first end, thereby forming a gap between the first end and the second end to open or expose the channel. For example, with the pin in the open position, the intermediate portion of the lifting lug may be positioned into or out of the channel via the gap. In the closed position, the pin may span from the first end to the second end, thereby occluding the gap and enclosing the channel. Indeed, the pin may be transitioned to the closed position to block relative movement of the intermediate portion of the lifting lug out of the channel of the shackle, thereby securing the shackle onto the lifting lug. The shackle may then be used to impart a force onto the lifting lug to lift the HVAC unit. Thus, the lifting lug may be used as a mounting or an attachment point for lifting the HVAC unit via the shackle.

The intermediate portion of the lifting lug may include a notch or a cut (e.g., a cutout) that may receive or accommodate the pin. The notch may be shaped to facilitate transitioning of the pin between the closed position and the open position. That is, the notch may provide sufficient clearance to enable the pin to extend between the first end and the second end of the segment of the shackle. For example, when the HVAC unit is placed on a surface (e.g., a flat surface, such as the ground or a trailer bed), an edge of the intermediate portion of the lifting lug may be positioned proximate to the surface. The notch may provide sufficient clearance between the edge of the intermediate portion and the surface to enable the pin to traverse the thickness of the intermediate portion and secure the shackle onto the lifting lug. In this manner, the lifting lug may be shaped to better facilitate securement of the shackle to the lifting lug. As a result, the lifting lug may improve installation of the shackle and lifting of the HVAC unit. Further, the notch may include a geometry (e.g., a semicircular geometry) that may capture a shape of the pin of the shackle during a lifting operation. That is, during the lifting operation, the pin may be positioned within the notch, and the notch may block certain movement of the pin and the shackle relative to lifting lug. As such, the notch may enable stabilization of the HVAC unit during the lifting operation. Although the present disclosure primarily discusses incorporation of the lifting lug in an HVAC unit, the lifting lug may be used for any suitable system or component to facilitate a lifting operation.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
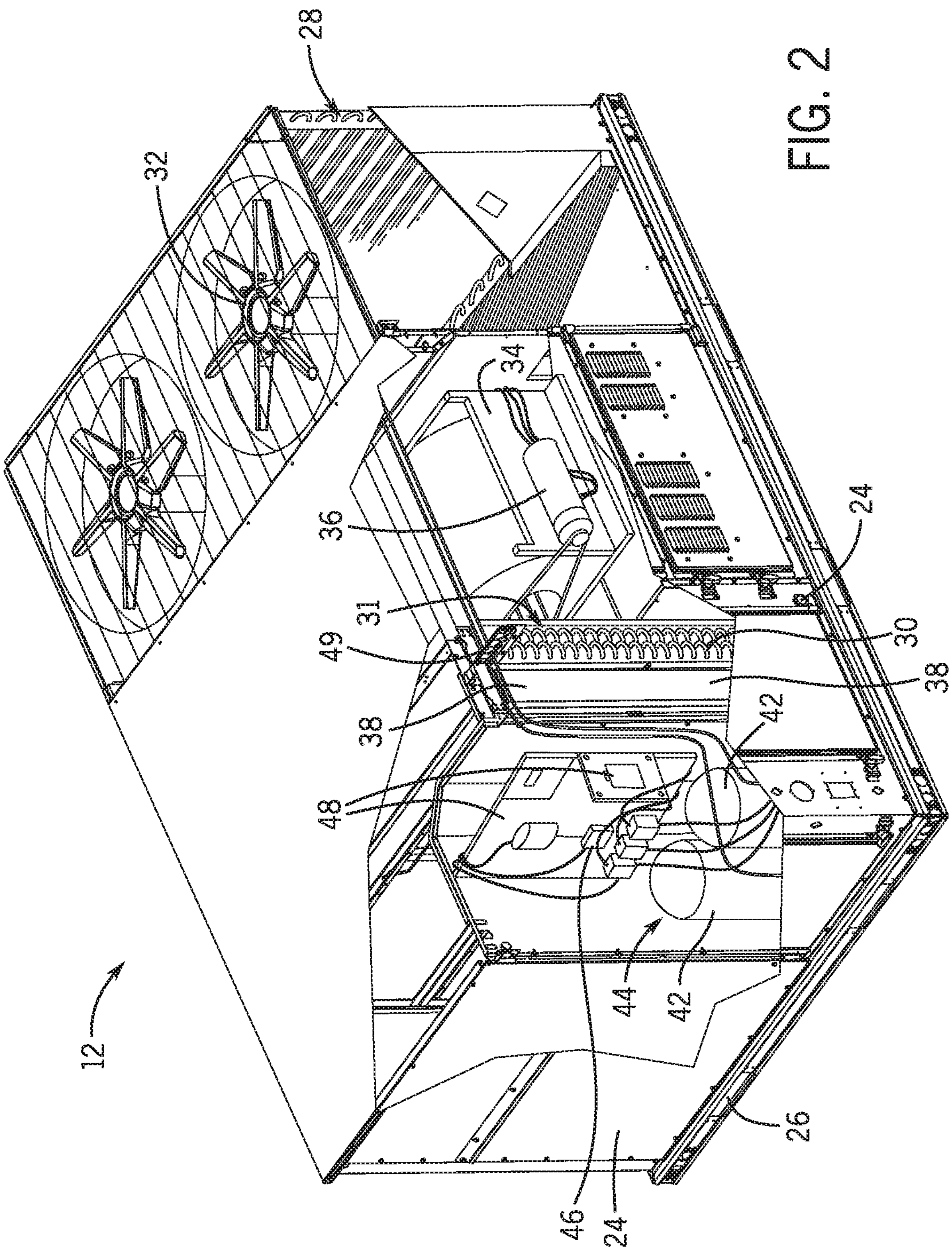
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
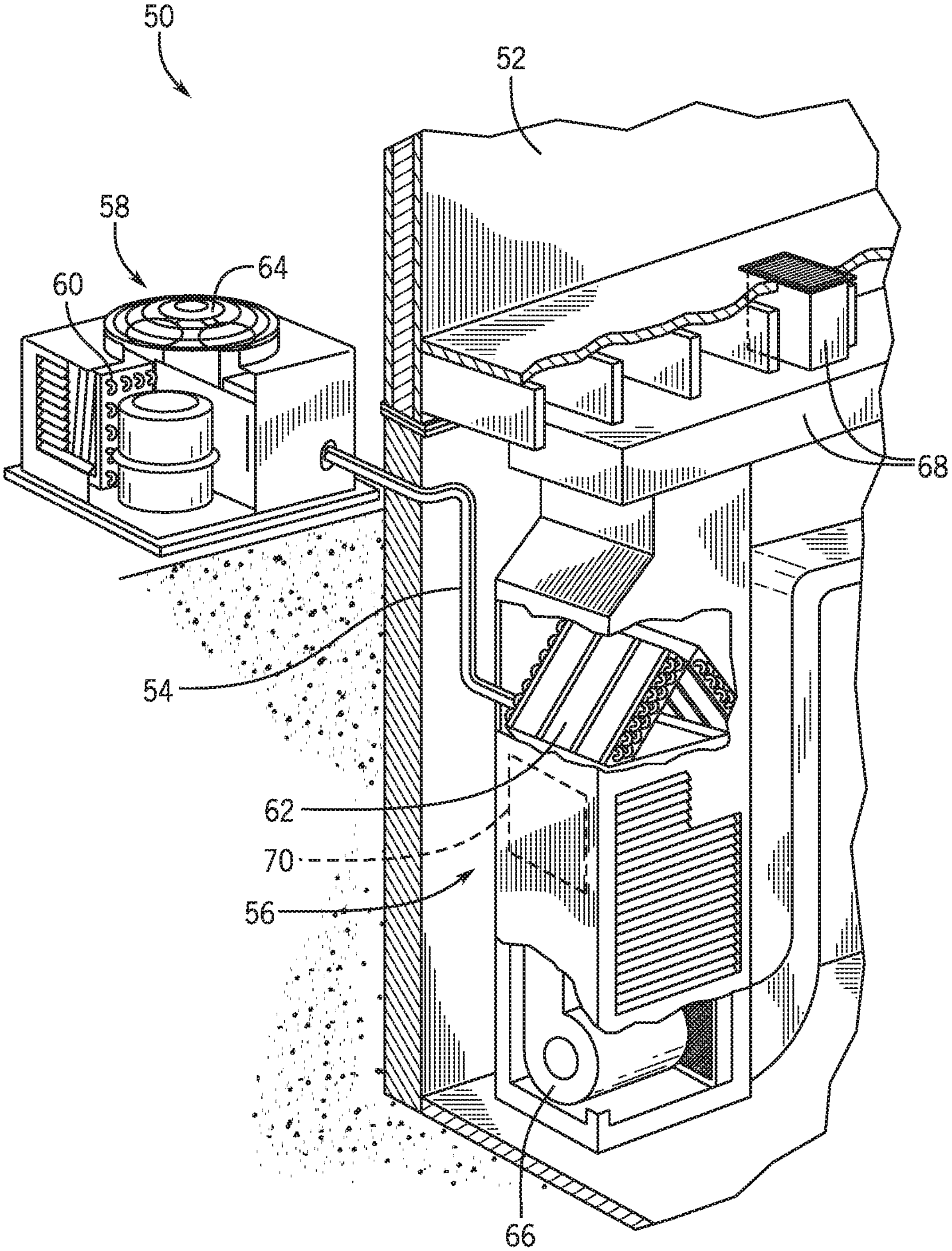
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
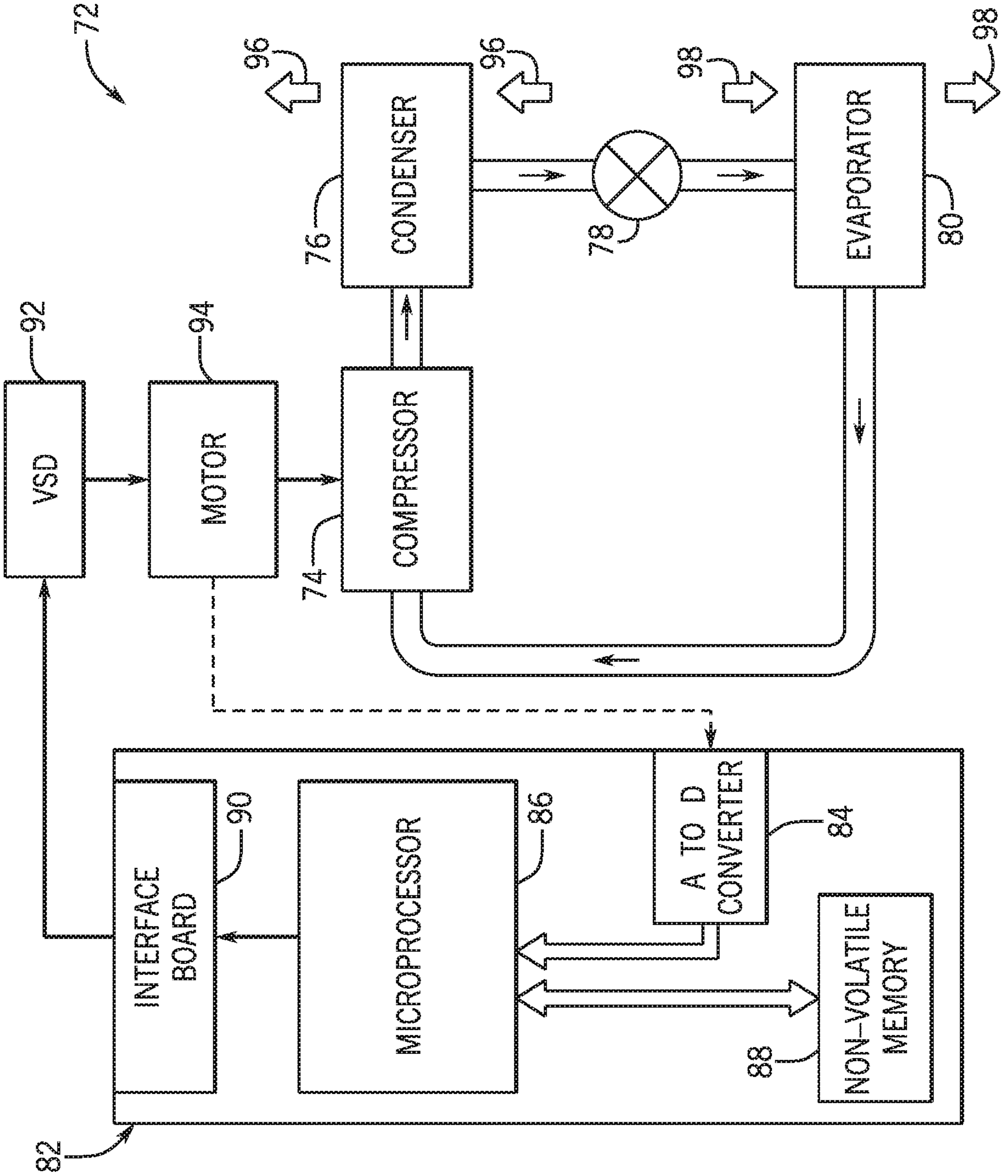
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to a lifting lug that may be incorporated in an HVAC unit to facilitate lifting of the HVAC unit or of a portion of the HVAC unit. As an example, the lifting lug may be coupled to the HVAC unit 12, such as to one of the rails 26, to facilitate lifting of the HVAC unit 12. The lifting lug may also be configured to removably couple to a shackle. For example, an intermediate portion or an intermediate segment of the lifting lug may be offset from the HVAC unit in an installed configuration of the lifting lug to form a space between the intermediate portion and the HVAC unit. The shackle may include a segment having a first end and a second end to define a channel, as well as a pin adjustably positioned between the first end and the second end. For example, the pin may be retracted from the second end to form a gap between the first end and the second end and expose the channel. In an installed configuration of the lifting lug, the second end of the segment may extend into the space between the intermediate portion of the lifting lug and the HVAC unit. The pin may then be positioned to extend from the first end and the second end to reduce the size of (e.g., close) the gap between the first end and the second end, thereby securing the shackle onto the lifting lug.

The intermediate portion may include a notch formed therein to facilitate the positioning of the pin described above. For example, the notch may provide sufficient clearance (e.g., between an edge of the intermediate portion of the lifting lug and a surface on which the HVAC unit is placed) to enable translation of the pin from the first end of the segment, past the intermediate portion of the lifting lug and to the second end of the segment. Further, the notch may capture the pin and block movement between the lifting lug and the shackle during a lifting operation of the HVAC unit. As such, the notch facilitates securement between the shackle and the lifting lug, thereby facilitating lifting the HVAC unit via the lifting lug and the shackle.

Figure 5:
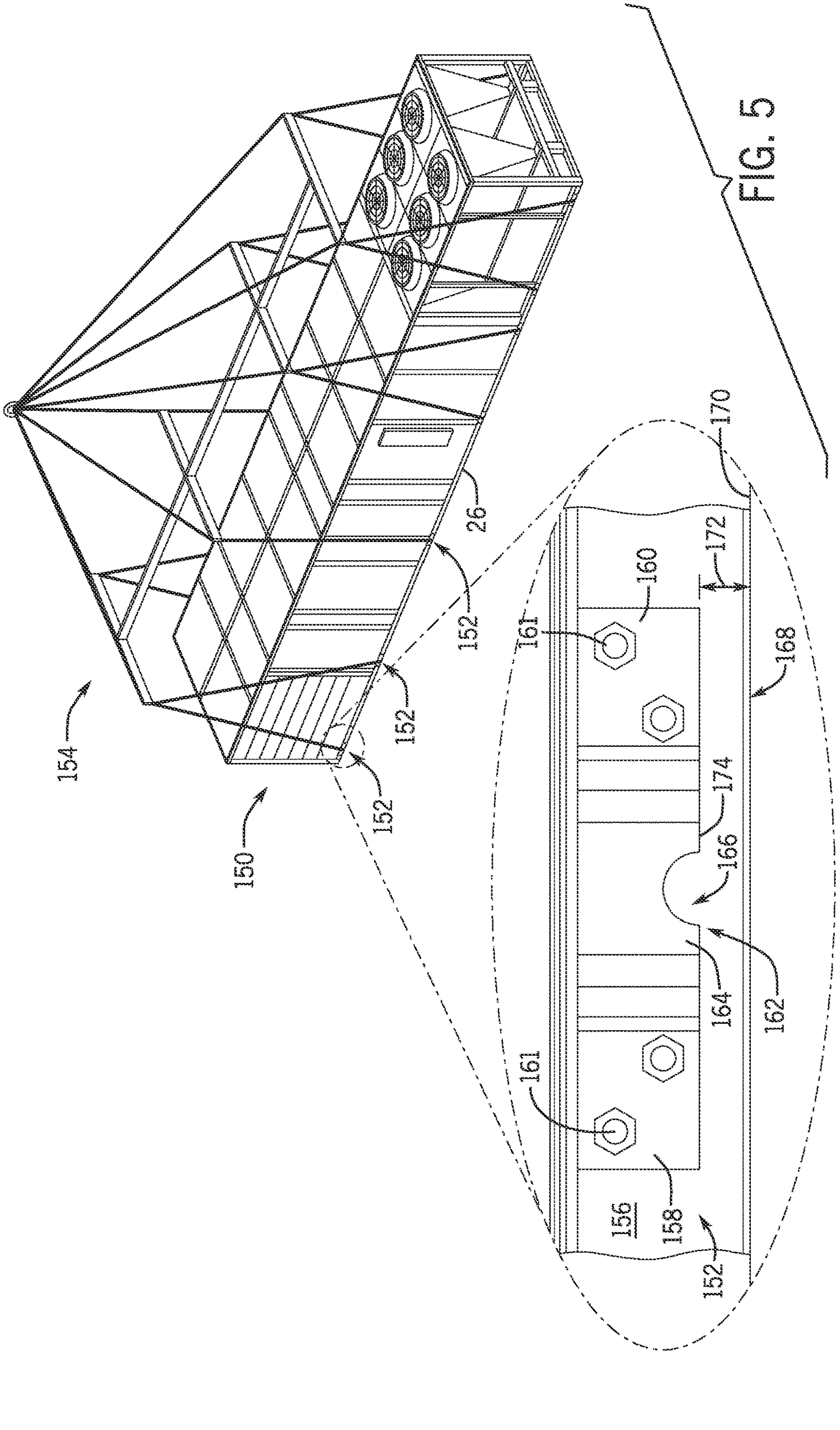
FIG. 5 is a perspective view of an embodiment of an HVAC unit having lifting lugs to facilitate lifting the HVAC unit, in accordance with an aspect of the present disclosure.

With this in mind, FIG. 5 is a perspective view of an embodiment of an HVAC unit 150 (e.g., an RTU) that includes lifting lugs 152 configured to facilitate lifting of the HVAC unit 150. By way of example, the lifting lugs 152 may be used as attachment points for a lift system 154 (e.g., a crane) to lift the HVAC unit 150 so as to move the HVAC unit 150 to different locations or positions. Indeed, the HVAC unit 150 may include multiple lifting lugs 152 (e.g., four lifting lugs 152, six lifting lugs 152, eight lifting lugs 152, ten lifting lugs 152, twelve lifting lugs 152, fourteen lifting lugs 152, sixteen lifting lugs 152, eighteen lifting lugs 152, or more lifting lugs 152) to enable the lift system 154 to lift the HVAC unit 150. Indeed, the number of lifting lugs 152 used for lifting the HVAC unit 150 may be based on a size of the HVAC unit 150, a type of the HVAC unit 150, a configuration of the HVAC unit 150, or another suitable parameter. In some embodiments, each of the lifting lugs 152 may include the same design, but lifting lugs 152 having different designs may be incorporated in alternative embodiments.

In the illustrated embodiment, the lifting lugs 152 are configured to couple to a surface (e.g., an exterior surface) 156 of the HVAC unit 150. For example, each of the lifting lugs 152 may be secured to one of the rails 26 of the HVAC unit 150. As shown, each lifting lug 152 may include a first flange 158 and a second flange 160. Each of the first flange 158 and the second flange 160 may include openings or apertures through which fasteners 161 may be inserted to couple the lifting lug 152 to the HVAC unit 150 in an installed configuration of the lifting lug 152. That is, the fasteners 161 may be inserted through the openings of the flanges 158, 160 and into the HVAC unit 150 (e.g., the rail 26) to secure the flanges 158, 160 and the HVAC unit 150 to one another. In additional or alternative embodiments, the lifting lug 152 may be coupled to the HVAC unit 150 using other techniques, such as via a weld, an adhesive, and so forth.

The lifting lug 152 may include an intermediate or a lifting portion 162 extending between the flanges 158, 160. The intermediate portion 162 may be used to secure a shackle of the lifting system 154 to the lifting lug 152 for lifting of the HVAC unit 150. As an example, the intermediate portion 162 may include a segment (e.g., a lifting segment) 164 that is offset from the flanges 158, 160, thereby forming a space between the intermediate portion 162 and the surface 156 in the installed configuration. A shackle having a channel may be configured to extend through the space to enclose or loop around the segment 164 in order to secure the shackle to the lifting lug 152 within the channel. In certain embodiments, as further described herein, the shackle may include a pin configured to transition between an open position and a closed position to enable removable coupling of the shackle to the lifting lug 152. Indeed, in the closed position, the pin may traverse a thickness of the segment 164 to block relative movement of the segment 164 out of the channel of the shackle, thereby securing the shackle to the lifting lug 152. In the open position, the pin may be moved to form a gap that enables positioning of the segment 164 into or out of channel to couple the shackle to or decouple the shackle from the lifting lug 152, respectively.

A notch or a cut 166 (e.g., cutout) may be formed into the segment 164 to facilitate coupling of the shackle to the lifting lug 152. The notch 166 may receive the pin of the shackle to facilitate coupling and decoupling between the shackle and the lifting lug 152. By way of example, the lifting lug 152 may be positioned at a bottom portion 168, such as on a base rail (e.g., the rail 26), of the HVAC unit 150. As a result, when the HVAC unit 150 is placed on a surface 170 (e.g., the ground), a distance 172 between an edge 174 (e.g., base edge) of the segment 164 and the surface 170 may be limited. In some cases, the distance 172 may not provide sufficient clearance to enable the pin of the shackle to extend between the surface 170 and the edge 174 in order to traverse the segment 164, thereby blocking coupling between the shackle and the lifting lug 152. The notch 166 may provide increased clearance that enables the pin to be inserted between the segment 164 and the surface 170 and to extend across the segment 164. For example, the notch 166 may be formed into the edge 174 (e.g., extending inwardly from the edge 174) and through the thickness of the segment 164. In this manner, the notch 166 increases the spacing between the segment 164 and the surface 170 to enable insertion of the pin between the segment 164 and the surface 170, thereby enabling the shackle to be secured to the lifting lug 152 via the pin.

The notch 166 may be shaped based on a corresponding shape of the pin of the shackle. For example, the illustrated notch 166 includes a semicircular shape that may receive and capture a pin having a circular or cylindrical shape. Indeed, a size or dimension of the notch 166 may be based on an anticipated or expected size of the pin. For instance, the notch 166 may have a radius of 0.635 centimeters (0.25 inches), 0.95 centimeters (0.375 inches), 1.27 centimeters (0.5 inches), 1.6 centimeters (0.625 inches), 1.9 centimeters (0.75 inches), 2.22 centimeters (0.875 inches), 2.54 centimeters (1 inch), or greater than 2.54 centimeters. Additional or alternative notches 166 may include any suitable shape (e.g., a square shape, a pentagonal shape, a hexagonal shape, a heptagonal shape, an octagonal shape) that is selected to correspond with a shape of the pin to be inserted between the lifting lug 152 and the surface 170. In this manner, the notch 166 may be configured to receive the pin and may enable stabilization of the HVAC unit 150 during a lifting operation of the HVAC unit 150. For example, during the lifting operation, the notch 166 may capture a portion of the perimeter of the pin and may block movement of the pin relative to the lifting lug 152 (e.g., along the edge 174), thereby stabilizing positioning and movement of the HVAC unit 150 during the lifting operation. As a result, the disclosed lifting lug 152 may improve the lifting operation of the HVAC unit 150. Although the illustrated notch 166 is formed into the edge 174 of the intermediate portion 162, an additional or alternative lifting lug 152 may have an aperture or hole formed in a medial section of the segment 164 (e.g., away from edges of the intermediate portion 162), and the pin may be inserted through the aperture such that the segment 164 may capture an entirety of the perimeter of the pin.

In certain embodiments, the lifting lug 152 may be configured to be retrofit onto existing HVAC units. That is, the lifting lug 152 may be coupled to existing HVAC units (e.g., the rail 26 of an existing HVAC unit) to improve the lifting of such HVAC units. Indeed, the illustrated lifting lug 152 may replace existing lifting lugs of certain HVAC units to enable better securement of shackles onto the HVAC units and/or to stabilize the HVAC units during lifting operations.

Figure 6:
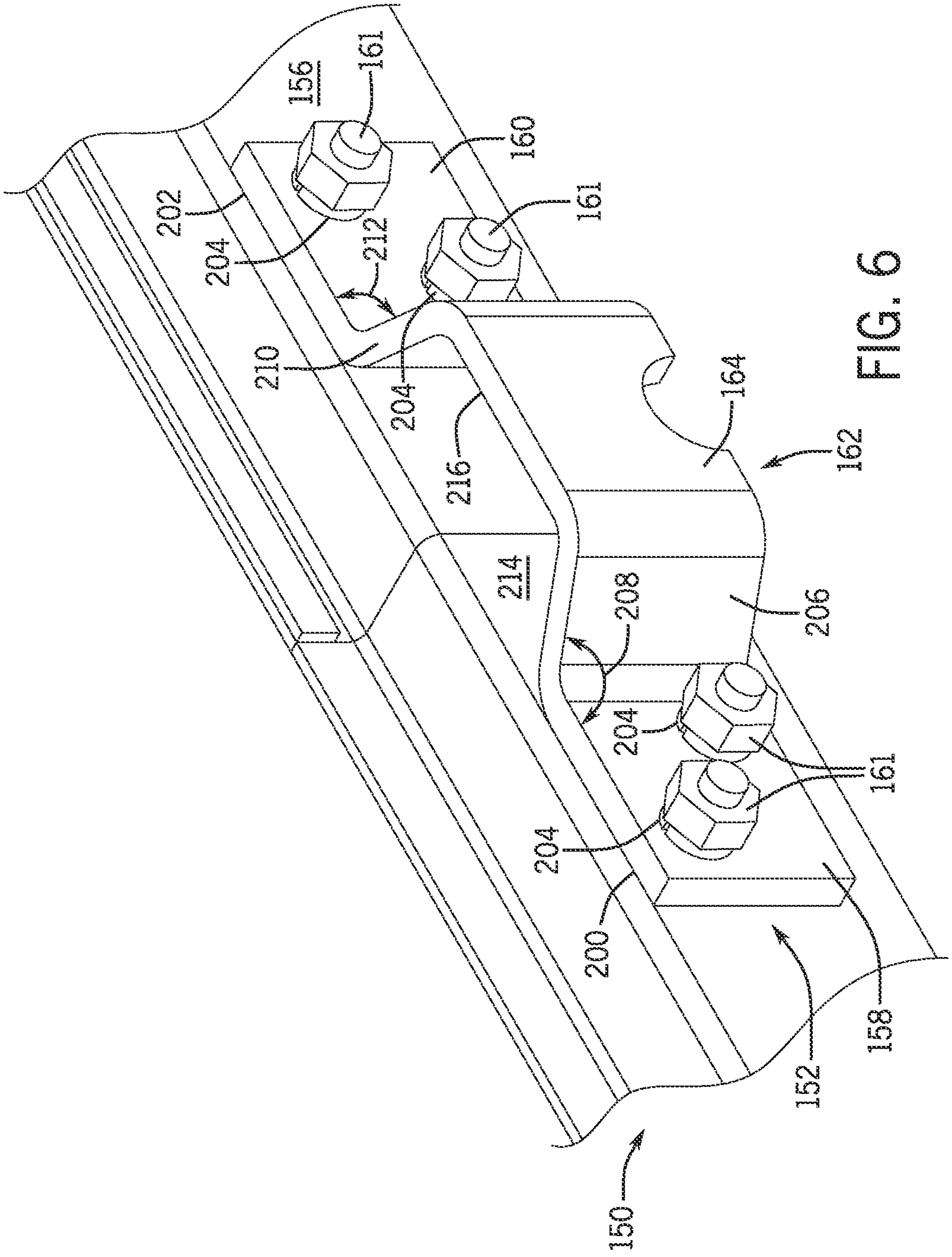
FIG. 6 is a perspective view of an embodiment of a lifting lug coupled to an HVAC unit to facilitate lifting the HVAC unit, in accordance with an aspect of the present disclosure.

FIG. 6 is a perspective view of an embodiment of the lifting lug 152 in the installed configuration. In the illustrated example, a first surface 200 of the first flange 158 abuts the surface 156 of the HVAC unit 150, and a second surface 202 of the second flange 160 abuts the surface 156. For instance, each of the surfaces 200, 202 may extend along a common direction as the surface 156 in the installed configuration such that the surfaces 200, 202 are flush with the surface 156 to enable coupling and securement between the flanges 158, 160 and the HVAC unit 150. Each of the flanges 158, 160 includes two apertures 204 configured to receive the fasteners 161. Additionally, the intermediate portion 162 includes a first extension 206 extending from the first flange 158 to the segment 164 at a first angle 208 and a second extension 210 extending from the second flange 160 to the segment 164 at a second angle 212. The first extension 206 may extend from the first flange 158 to a first side of the segment 164, and the second extension 210 may extend from the second flange 160 to a second side, opposite the first side, of the segment 164. In some embodiments, the first angle 208 and the second angle 212 are substantially equal (e.g., within 1 degrees, within 2 degrees) to one another. In additional or alternative embodiments, the first angle 208 and the second angle 212 may be different from one another. Further, although each of the illustrated angles 208, 212 are oblique angles, in additional or alternative embodiments, the angles 208, 212 may be right angles or any other suitable angle.

As discussed herein, the segment 164 may be offset from the surface 156 in the installed configuration of the lifting lug 152. That is, a space 214 may be formed between the surface 156 of the HVAC unit 150 and a surface 216 of the segment 164 to enable positioning of a portion of the shackle within the space 214. In this way, the shackle may be positioned to encircle or capture the intermediate portion 162 (e.g., the segment 164) of the lifting lug 152, thereby securing the shackle to the lifting lug 152. In certain embodiments, the surface 216 may also extend along the same direction as the surfaces 156, 200, 202 in the installed configuration of the lifting lug 152. In other words, the surfaces 156, 200, 202, 214 may be parallel or generally parallel (e.g., within 1 degrees, within 2 degrees) to one another in the installed configuration.

In the illustrated embodiment, the lifting lug 152 includes substantially the same thickness (e.g., within 0.05 inches, within 0.1 inches, within 0.15 inches) throughout a length of the lifting lug 152. That is, each of the flanges 158, 160, the extensions 206, 210, and the segment 164 may have substantially the same thickness. As an example, the lifting lug 152 may include a thickness of 0.79 centimeters (0.3125 inches), 0.95 centimeters (0.375 inches), 1.27 centimeters (0.5 inches), or another suitable thickness. In additional or alternative embodiments, the thickness of the lifting lug 152 may vary along the length of the lifting lug 152. Indeed, the lifting lug 152 may include any suitable thickness that provides the lifting lug 152 with sufficient strength to enable lifting of the HVAC unit 150 via the lifting lug 152.

In some embodiments, the lifting lug 152 may be formed as an integral piece, such as from sheet metal that is bent or otherwise formed to have the geometry of the lifting lug 152. That is, the flanges 158, 160 and the intermediate portion 162 may be continuous with one another as a single piece. In additional or alternative embodiments, the lifting lug 152 may be formed from separate components that are attached to one another. For instance, the flanges 158, 160 may be separate from the intermediate portion 162 (e.g., from the extensions 206, 210, from the segment 164). The components may be coupled to one another to form the lifting lug 152. Furthermore, although the illustrated flanges 158, 160 extend outwardly away from the intermediate portion 162, in additional or alternative embodiments, the flanges 158, 160 may extend into the space 214 in order to reduce a physical footprint of the lifting lug 152.

Figure 7:
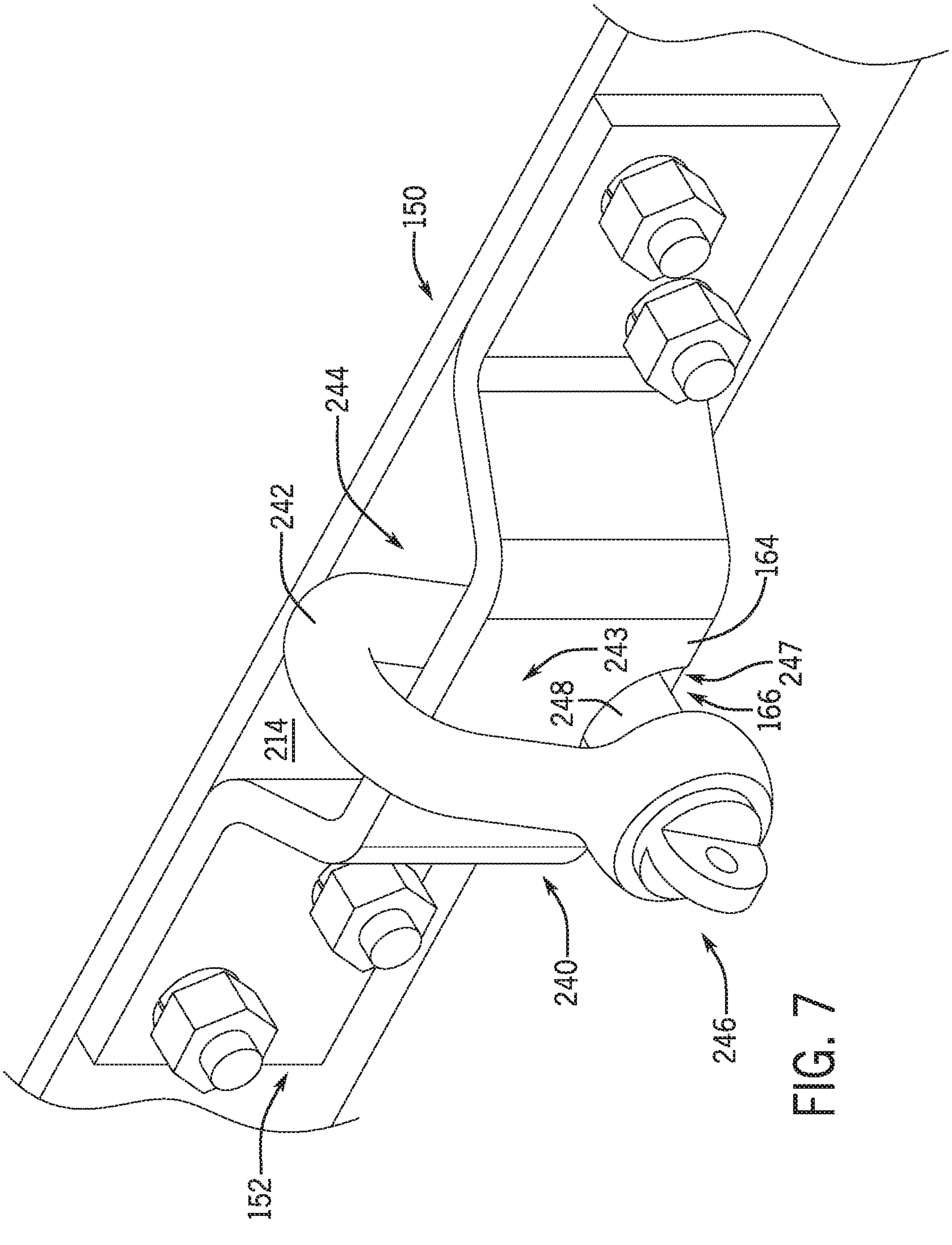
FIG. 7 is a perspective view of an embodiment of a lifting lug and a shackle coupled to an HVAC unit, in accordance with an aspect of the present disclosure.

FIG. 7 is a perspective view of an embodiment of the lifting lug 152 in the installed configuration, illustrating a shackle 240 secured to the lifting lug 152. The illustrated shackle 240 includes a segment 242 having a U-shaped configuration and forming a channel 243. To couple the shackle 240 to the lifting lug 152, a first end 244 of the segment 242 may be inserted into the space 214 between the segment 164 and the HVAC unit 150, and a second end 246 of the segment 242 may remain external to the space 214. To this end, a gap 247 may be formed between the first end 244 and the second end 246 (e.g., between distal ends of the shackle 240), and the segment 164 of the lifting lug 152 may be positioned within the channel 243 such that the ends 244, 246 are positioned on opposite sides of the segment 164. Furthermore, the shackle 240 includes a pin 248 that may extend from the second end 246 toward the first end 244. In a closed position of the shackle 240, as illustrated in FIG. 7, the pin 248 may traverse the thickness of the segment 164 and may span from the first end 244 to the second end 246. Accordingly, the pin 248 may span across the gap 247 between the first end 244 and the second end 246, thereby securing the shackle 240 about the lifting lug 152 and blocking movement of the segment 164 from out of the channel 243.

The notch 166 may facilitate positioning of the shackle 240 in the closed or secured position. For example, the pin 248 may be inserted through the notch 166 to extend across the segment 164. During a lifting operation of the HVAC unit 150, the notch 166 may receive and capture the pin 248 to block movement (e.g., translational movement) of the shackle 240 relative to the lifting lug 152, thereby increasing stability of the securement between the shackle 240 and the lifting lug 152. The notch 166 may also facilitate transitioning of the shackle 240 to an open or a released position, in which the pin 248 may be moved away from the first end 244. By way of example, movement of the pin 248 away from the first end 244 may expose the gap 247 between the first end 244 and the second end 246 to enable removal of the shackle 240 from the segment 164 via the gap 247. Accordingly, in the open position, the shackle 240 may be coupled to or decoupled from the lifting lug 152.

Figure 8:
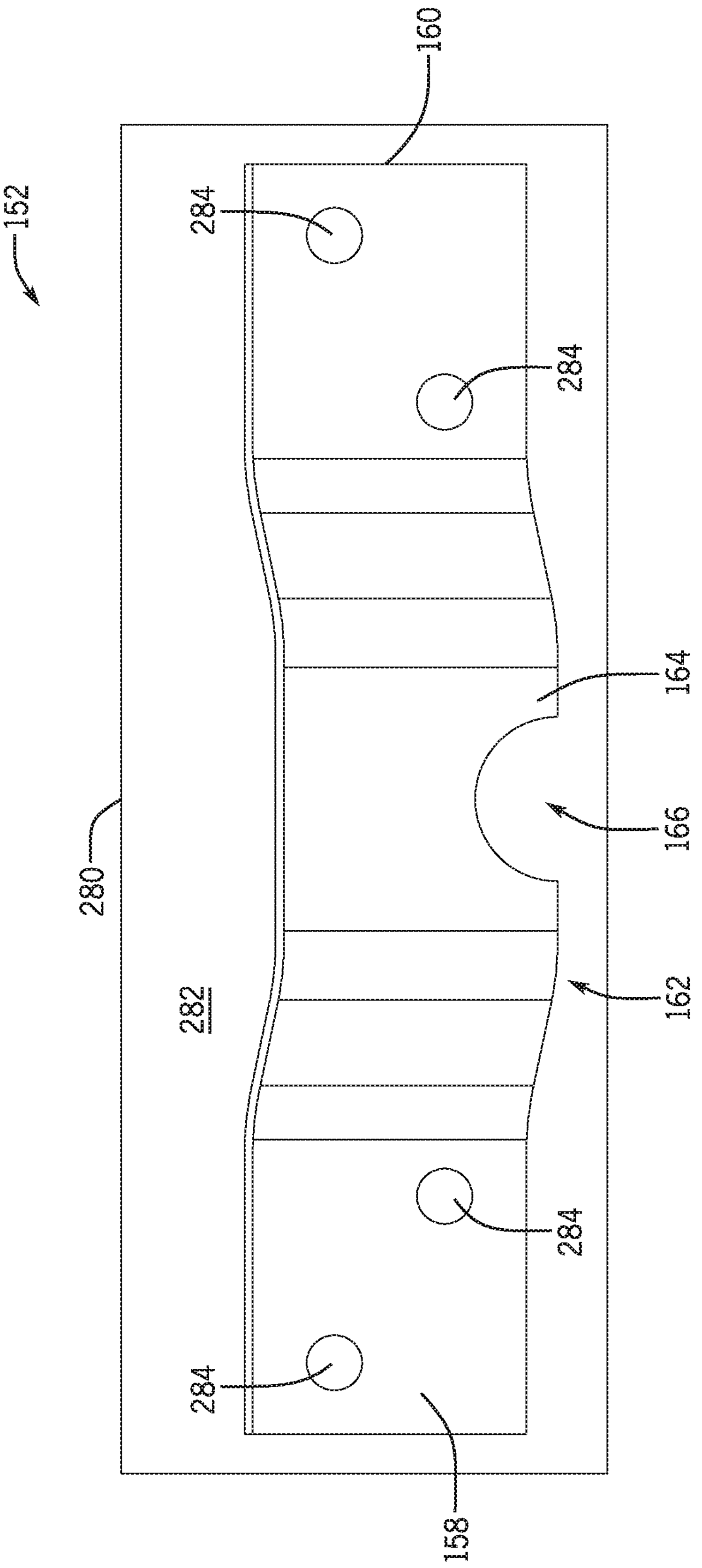
FIG. 8 is a front view of an embodiment of a lifting lug that may be used to facilitate lifting an HVAC unit, in accordance with an aspect of the present disclosure.

FIG. 8 is a perspective view of an embodiment of the lifting lug 152 in which the flanges 158, 160 are coupled to a plate 280 of the lifting lug 152. For example, the flanges 158, 160 may be welded onto a surface 282 of the plate 280. In the illustrated embodiment, the intermediate portion 162 may be offset from the surface 282 to enable a shackle (e.g., the shackle 240) to couple to the lifting lug 152, such as via a pin (e.g., the pin 248) extending through the notch 166. The plate 280 may be configured to couple to the HVAC unit 150 in the installed configuration of the lifting lug 152. For instance, holes or apertures 284 may be formed through the flanges 158, 160 and the plate 180, and the fasteners 161 may be inserted in order to couple the plate 280 onto the HVAC unit 150 (e.g., onto the rail 26). Thus, the plate 280 may be secured onto (e.g., abut) the HVAC unit 150, and the flanges 158, 160 may be secured onto (e.g., abut) the plate 280. The plate 280 may increase a surface area used for coupling the lifting lug 152 to the HVAC unit 150, thereby increasing securement between the lifting lug 152 and the HVAC unit 150 and increasing stabilization of the lifting lug 152 during a lifting operation.

The present disclosure may provide one or more technical effects useful in the lifting of an HVAC unit. For example, a lifting lug may be coupled to a surface of the HVAC unit, such as a base rail. The lifting lug may include a segment that is offset from the surface in an installed configuration of the lifting lug. A notch may be formed into the segment, and the notch may be configured to receive a pin of a shackle that is configured to couple to the lifting lug. For example, the shackle may include a channel in which the segment may be positioned, and the notch may provide sufficient clearance that enables the pin to traverse the thickness of the lifting lug and close the channel of the shackle, thereby securing the segment within the channel and securing the shackle onto the lifting lug. Accordingly, the lifting lug may facilitate coupling between the shackle and the lifting lug. Furthermore, during a lifting operation of the HVAC unit via the shackle and the lifting lug, the segment may capture the pin within the notch, thereby blocking certain movement of the shackle and the lifting lug relative to one another. In this manner, the lifting lug may improve the lifting operation. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A lifting lug for a heating, ventilation, and/or air conditioning (HVAC) unit, the lifting lug comprising:
- a first flange configured to be secured against a surface of the HVAC unit;
- a second flange configured to be secured against the surface of the HVAC unit; and
- an intermediate portion extending between the first flange and the second flange, wherein the intermediate portion is offset from the first flange and the second flange to form a space extending from the intermediate portion to the surface of the HVAC unit in an installed configuration of the lifting lug, and the intermediate portion comprises an edge and a notch formed in the edge and through a thickness of the intermediate portion.

2. The lifting lug of claim 1, wherein the notch is configured to receive a pin of a shackle configured to couple to the lifting lug.

3. The lifting lug of claim 1, wherein the notch comprises a semicircular geometry.

4. The lifting lug of claim 1, wherein the first flange comprises an aperture formed therein, and the aperture is configured to receive a fastener configured to secure the lifting lug to the HVAC unit in the installed configuration of the lifting lug.

5. The lifting lug of claim 1, wherein the intermediate portion comprises a lifting segment having the notch, a first extension extending from the first flange to the lifting segment, and a second extension extending from the second flange to the lifting segment.

6. The lifting lug of claim 5, wherein the first extension extends from the first flange at a first angle, and the second extension extends from the second flange at a second angle.

7. The lifting lug of claim 6, wherein the first flange, the second flange, and the lifting segment extend in a common direction.

8. The lifting lug of claim 6, wherein the first angle, the second angle, or both, comprise an oblique angle.

9. The lifting lug of claim 1, wherein the thickness of the intermediate portion comprises 0.25 inches, 0.375 inches, 0.5 inches, 0.625 inches, 0.75 inches, 0.875 inches, 1 inch, or any combination thereof.

10. The lifting lug of claim 1, wherein the first flange extends from a first side of the intermediate portion, and the second flange extends from a second side, opposite the first side, of the intermediate portion.

11. The lifting lug of claim 1, wherein the first flange, the second flange, and the intermediate portion are integrally formed with one another.

12. The lifting lug of claim 1, wherein the intermediate portion comprises a segment that extends between the first flange and the second flange, wherein the segment is planar.

13. The lifting lug of claim 12, wherein the notch is formed along the segment.

14. A heating, ventilation, and/or air conditioning (HVAC) unit, comprising:
- an exterior surface; and
- a lifting lug coupled to the exterior surface, wherein the lifting lug comprises a lifting portion, a first flange extending from a first side of the lifting portion, and a second flange extending from a second side the lifting portion, wherein the first flange and the second flange are secured against the exterior surface, the lifting portion is offset from the exterior surface to form a space extending from the lifting portion to the exterior surface, and the lifting portion comprises an edge and a notch formed in the edge.

15. The HVAC unit of claim 14, wherein the HVAC unit comprises a plurality of lifting lugs comprising the lifting lug, wherein the plurality of lifting lugs comprises four lifting lugs, six lifting lugs, eight lifting lugs, ten lifting lugs, twelve lifting lugs, fourteen lifting lugs, sixteen lifting lugs, or eighteen lifting lugs.

16. The HVAC unit of claim 14, wherein the lifting lug comprises a first extension extending from the lifting portion to the first flange and forming a first angle with the first flange, and a second extension extending from the lifting portion to the second flange and forming a second angle with the second flange, and the first angle is equal to the second angle.

17. The HVAC unit of claim 14, wherein the notch comprises a semicircular geometry.

18. The HVAC unit of claim 14, comprising a base rail comprising the exterior surface.

19. A lifting lug for a heating, ventilation, and/or air conditioning (HVAC) unit, the lifting lug comprising:

a first surface configured to be secured against a second surface of the HVAC unit in an installed configuration of the lifting lug; and a lifting portion offset from the first surface and configured to be offset from the second surface of the HVAC unit in the installed configuration to form a space extending from the lifting portion to the second surface of the HVAC unit, wherein the lifting portion comprises an edge and a notch formed in the edge.

20. The lifting lug of claim 19, comprising an extension extending from the lifting portion to the first surface at an angle to offset the lifting portion from the first surface.

* * * * *